United States Patent

Harr

[15] 3,691,620
[45] Sept. 19, 1972

[54] PROCESS OF PROVIDING A FUEL TANK IN A VEHICLE

[72] Inventor: George B. Harr, 1240 S. Marengo Ave., Pasadena, Calif. 91106

[22] Filed: May 22, 1969

[21] Appl. No.: 840,580

Related U.S. Application Data

[63] Continuation of Ser. No. 601,818, Nov. 28, 1966, abandoned, which is a continuation-in-part of Ser. No. 563,774, July 19, 1966, abandoned, which is a continuation-in-part of Ser. No. 480,634, Aug. 18, 1965, abandoned, which is a continuation-in-part of Ser. No. 413,790, Nov. 25, 1964, abandoned.

[52] U.S. Cl. ........................29/451, 220/88, 53/24
[51] Int. Cl. ..................................B23p 11/02
[58] Field of Search ......29/451, 455; 220/88; 53/24; 5/339; 15/244, 244 A, 21.1; 118/270

[56] References Cited

UNITED STATES PATENTS

| | | | |
|---|---|---|---|
| 770,914 | 9/1904 | Marshall | 118/270 |
| 1,565,414 | 12/1925 | Byrne | 15/244 UX |
| 2,234,506 | 3/1941 | Sistig | 5/337 UX |
| 2,305,923 | 12/1942 | Held | 220/88 |
| 3,068,561 | 12/1962 | Jones | 29/455 UX |

FOREIGN PATENTS OR APPLICATIONS

| | | | |
|---|---|---|---|
| 187,112 | 10/1922 | Great Britain | 15/21.1 |
| 1,052,912 | 3/1959 | Germany | 29/455 |
| 453,737 | 6/1913 | France | 15/244 A |

Primary Examiner—Charlie T. Moon
Attorney—S. M. Clark and Willard L. G. Pollard

[57] ABSTRACT

The interior of a fuel cell is filled with reticulated foam which is inserted into the fuel cell by being stuffed through an opening in the wall thereof. The foam may be enclosed by an integument placed in the cell before the foam, or the foam may be stuffed through the opening enclosed in the integument.

2 Claims, 8 Drawing Figures

PATENTED SEP 19 1972  3,691,620

PROCESS OF PROVIDING A FUEL TANK IN A VEHICLE

This application is a continuation of my application, Ser. No. 601,818 filed Nov. 28, 1966 (abandoned) which is a continuation of my application, Ser. No. 563,774 filed July 19, 1966 (abandoned), which in turn is a continuation-in-part of my application, Ser. NO. 480,634 filed Aug. 18, 1965 (abandoned) which in turn is a continuation-in-part of my application, Ser. No. 413,790 filed Nov. 25, 1964 (abandoned).

The containment of liquids within tankage wherein the tank and its contents will be subjected to varying degrees of dynamic usage presents several problems, the attempted solutions for which have been many. The problem is caused by the surging of the liquid toward one end of the tankage, resulting in the development of high tank wall tensions. In the instance of partially filled tankage, the hydraulic surging, in addition to imposing high tank wall tensions, results in a severe shift in the center of gravity of the contained liquid. Attempts to mitigate the strain loading and center-of-gravity shift in the instance of rigid tanks have involved the use of baffles, etc. In the instance of flexible tankage such as rubber-coated fabric tanks, surging or slosh control has been attempted by various pressurization and tie-down means.

The purpose of this invention is two-fold. It provides a new process of producing an integument-enclosed cellular body to be used in solving the above-mentioned problems while permitting free drainage of liquid from the container, and, secondly, it provides for the assembly of a foam interior in a container.

This invention relates to containers for liquids which comprise a flexible or possibly rigid cellular interior of polymeric material encapsulated by an impermeable integument, and the production thereof. The integument includes at least one fitting which provides means for introducing a liquid into the container and removing a liquid therefrom. The integument may be flexible or rigid. The cellular interior may be flexible or rigid and is preferably a foamed plastic. The integument and cellular interior may be separate or the integument may be anchored to the cellular interior so that no separation of the two occurs during the intended usage.

The invention includes the lamination of plastic or other sheet material to a cellular body of polymeric foam and the process of forming such a lamination. It also includes the formation of a plastic integument over a foamed interior. Alternatively the foamed interior may be inserted in the covering integument. The container is useful for packaging various liquids such as water, etc., but is particularly designed for use as a fuel container. The cellular interior is of the communicating-cell-type — not the closed-cell type. It will be appreciated that foams have variable degrees of openness and consequent varying rates for the percolation of liquid therethrough; and foams of varying degrees of openness in this respect will be selected with the particular application in mind. For instance, if the chief consideration is to reduce sloshing, and rate of drainage is a secondary factor, there will be selected a foam in which the openings in the cell walls are quite small so as to offer a large resistance to the permeation of liquids therethrough. On the other hand, in certain other applications freedom of flow may be of greater importance, in which case more open-structure foam may be used — for instance, reticulated foams of the type disclosed in Scott Chemotronics Oet Reticulation Patents in Chemical and Engineering News for June 7, 1965, page 42, which refers to patents which describe different methods of reticulation. Its density is preferably in the range of 1.0 to 2 or 3, and possibly up to 8 pounds per cubic foot.

In terms of volume density, the solid matter of the foam may preferably occupy only approximately 0.8 to 0.15 percent of the gross volume of the foam. Conversely stated, the cellular material will contain from 85 to 99.2 percent of voids, based on the total volume of the cellular material.

The integument may be rigid, as in a vehicle fuel tank or a tank for shipping or storing a liquid, etc. It may be flat or shaped, as by molding.

Alternatively, the integument may be flexible, as in a vehicle fuel tank to be stuffed into a rigid cavity in the vehicle or a collapsible shipping or storage container, or cylindrical container to be rolled over rugged terrain, etc.

Whether the integument is rigid or flexible the cellular interior may be rigid, to give permanent shape to an integument which may be flexible and need rigidifying, or may be rigid and need reinforcement.

The interior may be flexible for stuffing through a small opening in a rigid integument, or for providing a collapsible interior to a flexible integument so that it may be flattened when empty for return shipment or other use.

If the integument is rigid of itself and either metallic or non-metallic the cellular interior may be bonded or otherwise anchored to the inner wall of the integument, although this is not necessary.

If the integument is flexible of itself, and unsupported it is preferable and may be necessary to bond or otherwise anchor the cellular interior to the inner wall of the integument.

If the integument is flexible but is externally supported by a rigid shell, the cellular interior may or may not be anchored to it.

When the integument is permanently anchored to the cellular body, as in a fuel container, for example, and the container is subjected to stress loading, as by rapid acceleration or deceleration of the vehicle carrying the same, the integument remains adhered to the cellular body and does not separate, which would result in a free space in which there would be free flow of the liquid contrary to an objective of this invention.

In the embodiments to be shown hereafter, the foamed interior body of the cells are shown as occupying substantially all of the space available within the integument. Maximum support of the integument will be secured in this way. However, it will be appreciated that the foam body need not occupy the entirety of the space, and that a substantial dampening of the sloshing action may be obtained by the occupying of any substantial portion of the interior of the integument by the foamed body, Along this line, substantially free passages and/or channels may be cut through the foamed body in order to facilitate drainage of the contents to the withdrawal fitting or for the accommodation of float gauges, capacitance gauges or the like.

The integument and the cellular body are both preferably made of polyurethane because this can be done at a reasonable cost and the polyurethane is resistant to attack by the wide variety of liquids usually employed. The liquids, if fuels, may be such as are used in internal combustion engines, or they may be fuels for heating a boiler, for example, externally, etc. The fuel may be a diesel fuel or a high-octane gasoline or any other fuel.

Although polyurethanes are presently preferred, other plastics may be used for the integument and/or for the cellular body. For example, the integument may be polyvinyl chloride or a polypropylene, etc., and the body may be of any such plastic depending upon the liquid contained within it. Likewise, the integument may be made from a nylon or polyester or other textile fabric impregnated with a rubbery material impervious to the tank contents which in the case of fuel would be, for instance, Buna N (butadiene-acrylonitrile rubber) made from pieces tailored and adhered together to conform to a shape designed to contain the body. Likewise, in addition to the preferred polyurethane, the body may be of any other suitable foamed, open- cell or skeletal material — for instance, foamed polyvinyl formal, foamed cellulose, foamed natural rubber, foamed SBR, foamed neoprene, foamed butadiene-acrylonitrile copolymers, foamed polyvinyl chloride, and the like.

An important application of the invention is for flexible fuel systems within rigid cavities in automobiles, ships and other vehicles. This requires a container composed of an integument and cellular interior which are both fuel resistant. In a preferred manner of use, the flexible integument is first inserted into the rigid cavity, and then the cellular interior is stuffed into this. The interior is preferably so resilient and of such a size that it expands within the integument and forces it against the wall of the cavity. This interior may or may not be anchored to the integument or otherwise held in place. The interior is of labyrinthic complexity which prevents the fuel from surging within the tank, on rapid acceleration or deceleration of the vehicle and this reduces or limits imposition of strain on the walls which might spring a seam in the integument; it prevents shifting of the load and center of gravity of the vehicle. In conjunction with the surge-mitigating characteristics of the cellular interior during periods of rapid acceleration or deceleration it is a characteristic of the cellular interior to permit normal drainage or emptying by means of casual gravity draining, pumping or squeezing. Thus, the labyrinth characteristics of the cellular interior permit relatively modest flow-through.

To produce the integument, the plastic of which it is composed may be preformed, but is preferably applied to the preshaped cellular body, preferably by spraying, although it may be brushed on, etc. A critical aspect of this adaptation of the invention is the proper application of an integument as a liquid by a process which will provide a reliable hole-free casing which is integrally anchored to the entire surface of the cellular interior which may be flexible or rigid. This is advantageously accomplished by applying the integument as a liquid over the interior and causing the liquid to gel in the surface cells of the interior, followed by permanent setting, such as by cross linking if a polyurethane, or fusion if a vinyl polymer, etc.

The liquids carried within such containers may be removed by gravity drainage, or by mechanical means such as suction or if the container is flexible, by compressing it. These containers may be quite small, of a few gallons capacity, or they may be much larger, holding hundreds of gallons.

If the cellular body is flexible, the removal of its liquid contents may cause it to flatten, and it may be shipped in such flattened condition for refilling.

The invention provides a new approach for the production of containers possessing collapsibility coupled with the surge-mitigating features which provide excellent center-of-gravity stabilization. For example, cellular bodies may be employed having a density of approximately only 1.5 lb. per cu. ft., and insofar as liquids of present primary interest may have densities ranging between 60 and 75 lb. per cu. ft. the great majority of the internal volume of the foam body is available for liquid contents, and the ratio of the liquid contents to the container structure is high.

The formation of an integument on a cellular body, by anchoring only the branched terminations at the surface of the cellular interior into the integument is described by reference to anchoring a polyurethane cellular interior into a polyurethane integument.

The polyurethane integument will be applied by separately supplying the precursor component thereof into a spray gun and there mixing it with a second component which is a mixture of a rapid curing agent and viscosity builder, and immediately projecting the combination upon the surface of the cellular interior. The viscosity builder may react chemically with the precursor, as by cross linking with it, or it may merely produce a physical thickening action.

The polyurethane precursor may be a polyether, in which the percentage of isocyanate groups may be larger or smaller. A suitable composition is the well-known Adiprene L-100 which is a fully saturated polymer which contains 4.0 to 4.3 percent of isocyanate groups, by weight, the balance of the molecule being, at least largely, polytetramethylene ether glycol of medium chain length of about 30 to 40 oxygen atoms. This is reacted with a diisocyanate to produce the precursor.

A rapid curing agent is used, such as MOCA which is 4,4'-methylene-bis (2-chloroaniline). This is mixed with the precursor in the spray gun, together with the viscosity builder. A good viscosity builder is a soluble thermoplastic copolymer of Bisphenol A and epichlorhydrin. This will cross link with the precursor. A small amount of a soluble thermoplastic polyurethane may be added, together with sufficient diisocyanate to cure it. A suitable formula for 100 parts of Adiprene L-100 precursor is:

| | |
|---|---|
| CURING AGENT: | |
| MOCA | 14.3 parts |
| VISCOSITY BUILDER: | |
| Soluble thermoplastic polyurethane | 1.02 parts |
| Dianisidine diisocyante | 0.37 parts |
| Thermoplastic copolymer of Bisphenol A and epichlorhydrin | 5 parts |
| SOLVENTS: | |
| Ethyl acetate | 5.7 parts |
| Methylethyl ketone | 13.2 parts |
| Methylisobutyl ketone | 2.69 parts |

The various components are mixed in the spray gun and sprayed on to the surface of the cellular interior. The sprayed coating cures rapidly at room temperature. Air is entrapped in the spray and forms fine cells in the deposit. If heat is used to hasten the cure, the cells become somewhat enlarged.

This spray composition sets up so rapidly that it is possible to spray on integument of fairly substantial thickness without its sagging or penetrating farther than the surface terminations of the cellular interior. It penetrates sufficiently into the surface pores of the interior to establish an adequate anchorage thereto by embedding the cellular terminations of the cellular interior therein and sets before penetrating so far as to be drawn so far away from the surface of the cell structure that the cell terminations protrude from the integument's outer surface.

The spray is applied over the surface of the cellular interior until an impervious integument is built up, and the thickness reaches a sufficient depth so as not to be ruptured by snags, tears, abrasions, etc. which are encountered during normal service usage and the stresses imposed by the hydraulic pressure of the container contents.

The invention is further described in connection with the drawings, in which.

Figure 1:
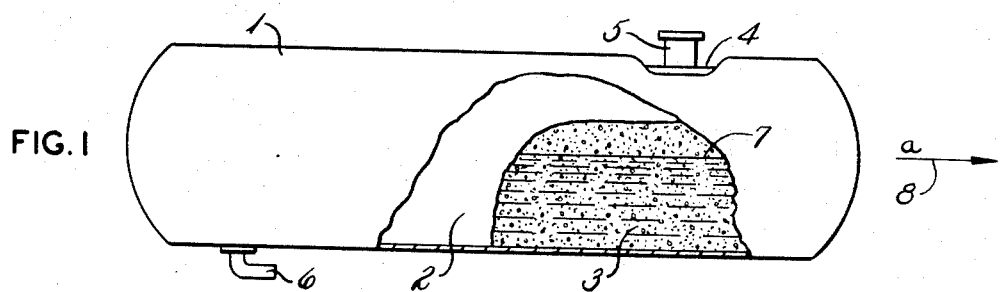
FIG. 1 is an elevation of a fuel tank for a racing car or any other use, partly broken away to show the contents.

FIG. 1 portrays a complete fuel-tank assembly composed of a rigid shell or fuel cavity 1 the interior of which contains the flexible liquid-impervious integument 2 into which has been inserted the cellular surge-mitigating foam material 3. As discussed above, this integument may be of any of a variety of flexible liquid-impervious materials such as a polyurethane skin or a tailored and adhered together impregnated fabric, etc. The foam may be a single piece which fills the entire integument, or it may be several pieces. As noted above, the foam may be of a variety of rubbery and/or plastic materials such as foam polyurethane, polyvinyl formal, neoprene or the like. The assembly is accomplished via oval opening 4 which is large enough to permit insertion of a folded collapsed tank liner integument 2. The opening 4 is plated off by an assembly consisting of an oval plate equipped with bolt holes or studs and equipped with filler neck and cap 5, including vent. The liquid-drainage system includes a connection 6 made directly through rigid shell 1 into the interior of integument 2, there being means to effect a fuel-tight seal between the shell and the integument. The drainage system on the interior of integument 2 may be manifolded to facilitate drainage of fluid from the cellular interior 3. In the example portrayed the container is only partially filled to the level 7. On substantial acceleration or deceleration in the direction of the arrow 8, the liquid level 7 is essentially undisturbed, due to the surge-mitigating cellular filling 3.

Figure 1A:
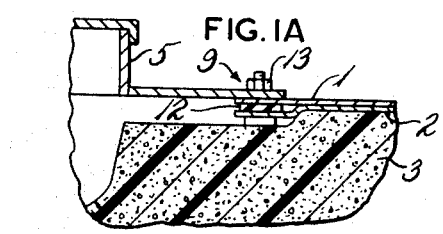
FIG. 1a is a detail showing a section through the tank at the access opening and filler neck.

FIG. 1a is an enlarged section of the access opening 4, showing the opening 9 in the rigid shell 1. The edge of the opening in the flexible integument 2 is fastened between the halves of the oval metallic fittings 12 which are fastened together by bolts 13. Closure plate and filler-neck assembly 5 is affixed after stuffing the interior of the integument with cellular material 3.

Figure 2:
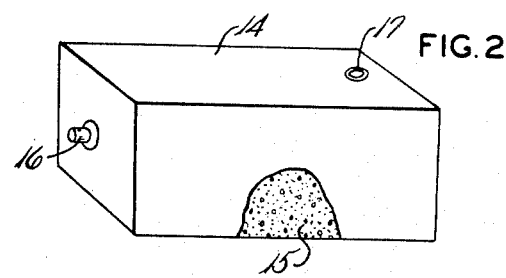
FIG. 2 is a view of a tank according to this invention, partly broken away to show the interior.

FIG. 2 represents a flexible container according to this invention. In this case the impervious flexible integument 14 completely encases and is bonded to the cellular interior 15. This may be done by an adhesive or by embedding the branched surface terminations of the cells of the interior in the integument before it is set up. Fittings 16 and 17 are employed for the filling and draining of the contents of the container.

Figure 3:
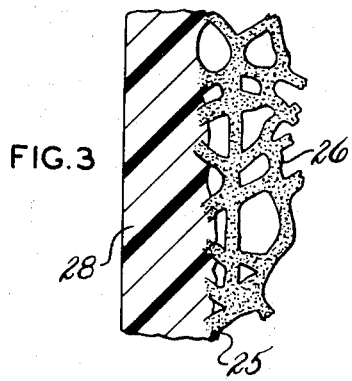
FIG. 3 is a section through a laminate of a plastic integument with branched surface terminations of a foamed interior embedded therein.

FIG. 3 represents a greatly enlarged cross section of a preferred construction in which the branched surface termination 25 of the foam interior 26 are embedded in the integument 28 in the manner disclosed herein. It will be noted that the integument is bonded to the surface portion only of the foam interior.

The liquid plastic from which the integument is formed is of high solids content and gels and cures rapidly so that it penetrates only the surface of the cellular interior. The integument is preferably of the same composition as the interior, although this is not essential. The bond between the two should be such that when under normal stress there is no separation. The composition of the cellular interior and the integument must be such that they are both resistant to any solvent action of the contained liquid.

Figure 4:
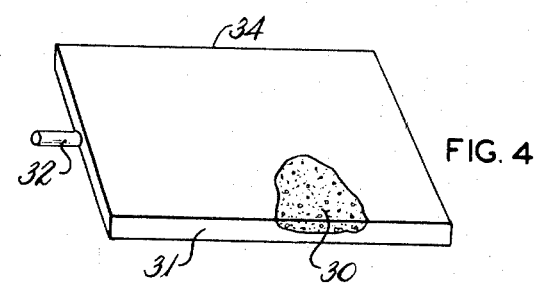
FIG. 4 is a view in perspective of a container capable of being collapsed by rolling rug-fashion.
Figure 5:
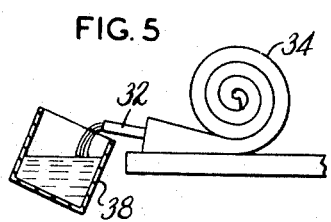
FIG. 5 is an elevation of the collapsed container.

FIG. 4 shows a simple and valuable adaptation of the invention in which the depth of the container is relatively small compared to its width and length. The foam interior 30 may be bonded to the integument 31 which encases the entire foam interior except for the one fitting 32 which serves as an inlet for supplying liquid to the container and also as an outlet for delivering liquid from the container. The foam interior and the integument are both flexible. The container may be filled by merely pouring liquid into it, providing a vent space for removal of displaced air, or the container may be filled by rolling it from the end 34, rug-fashion, while squeezing it, manually or otherwise, to express the air and then when the container is returned to its flat, extended condition with the filling 32 immersed in a liquid, the liquid is drawn into the container and fills it. The fitting 32 will be provided with a suitable closure. To remove the liquid, the closure is removed and the container is rolled, rug-fashion, while squeezing it (Fig. 5), and the liquid is dispensed through the fitting 32 into any suitable container 38.

Figure 6:
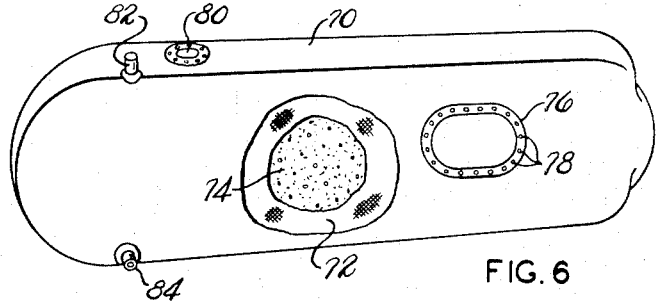
FIG. 6 is a perspective view of a fuel tank for a racing car, portions of which are cut away to show the interior construction thereof.
Figure 7:
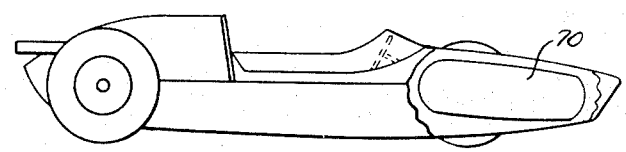
FIG. 7 is a representation of a racing automobile.

Referring now to Fig. 6, there is shown a racing car fuel cell in accordance with this invention, comprising an outer supporting metallic capsule 70 in the interior of which is disposed a flexible fuel-impermeable integument 72 of a square-woven polyester or nylon fabric impregnated with a vulcanized butadiene-acrylonitrile rubber composition. The whole of the integument may be separable from the capsule wall. This integument is built up from tailored pieces of the impregnated fabric seamed together and conforming closely to the interior of the metal capsule 70. Within the integument 72 is disposed a body 74 of polyurethane foam substantially completely filling the interior of the integument 72 and firmly pressing the same against the walls of the metal capsule 70. This foam gives a polyurethane-foamed base, upon a polyester prepolymer, and is a highly skeletonized type produced by any suitable method of reticulation. The body 74 may optionally be attached to the integument 72 by adhesives. In the wall of the metal capsule 70 is provided an access plate 76 secured in place by screws 78; the integument 72 containing the foam body 74 is compressed and squeezed through the opening provided by the removal of the plate 76 in the original manufacture of the capsule. A filler fitting 80 of construction generally similar to the filler fitting shown in Fig. 1a is provided at 80 for the introduction of fuel into the interior of the integument 72 and body 74. Connections 82 and 84 are made directly through the rigid capsule 70 into the interior of the integument 72. Connection 82 serves as a vent for the escape of air during the filling of the cell with fuel and for breaking vacuum when fuel is withdrawn from the cell. The fitting 84 is connected to the fuel-supply system of the racing car and serves to supply fuel thereto from the interior of the integument. The cellular body 74 contains approximately 96 percent voids by volume. The tank typically may contain 75 gallons of fuel.

The fuel tank of the construction shown in Fig. 6 is much less hazardous, particularly in racing service, than tanks used heretofore. In racing operations the greater stability of the center of gravity of the fuel load contributes to the reliable handling of the racer.

The rate the fuel flows out of the fuel tank in a racing car, when in use, is so slow that a foam with very small pores can be used. The pore size might even be as small as 100 pores per inch. The principal drawback with foams of the smaller pore sizes is the increased amount of fuel retained in the foam due to the large surface area exposed and its capillary effect on the fuel. Foams with a pore size of 10 to 50 pores per inch, or preferably about 20 pores per inch are generally quite satisfactory.

While the embodiment of Fig. 6 was developed particularly for high-speed racing, it will appreciated that this same design would present many of the same advantages in ordinary passenger and other automotive vehicle installations.

The drawings illustrate several adaptations of the invention, but it is to be understood that the invention is not limited thereto. For example, the container may be formed with two parallel, relatively thick and rigid walls with the adjoining walls thin and flexible so that the container may be collapsed by withdrawal of the contents by vacuum or pumping liquid therefrom. The container may have rigid walls or it may have flexible walls and be collapsible.

I claim

1. The method of providing a fuel tank in a vehicle for the reception of fuel, which method comprises putting a flexible, fuel-resistant integument having an opening therein, through an opening in a rigid tank with an opening in the integument substantially coinciding with said opening in the tank, and stuffing several pieces of fuel-resistant reticulated flexible foam into the integument through the integument tank opening, the opening in the tank being smaller in cross-section than the cross-section of the foam, and thereafter affixing a cover tight over the opening in the tank.

2. The process of claim 1 in which the foam expands within the tank and forces the integument against the inner surface of the tank.

* * * * *

PO-1050
(5/69)

UNITED STATES PATENT OFFICE
CERTIFICATE OF CORRECTION

Patent No. 3,691,620            Dated September 19, 1972

Inventor(s) George B. Harr

It is certified that error appears in the above-identified patent and that said Letters Patent are hereby corrected as shown below:

In the bibliographical data on the cover page of the patent, there should be inserted a designation of the assignee as follows:

-- [73] Assignee: The Firestone Tire & Rubber Company, Akron, Ohio --

Col. 2, line 2 "Oet" should be -- GET --

Col. 2, line 10 "0.15" should be -- 15.0 --

Col. 2, line 35 "," should be deleted

Col. 6, line 54 "filling" should be -- fitting --

Col. 8, line 31 the second "integument" should be cancelled per Examiner's Amendment of May 5, 1972

Signed and sealed this 27th day of November 1973.

(SEAL)
Attest:

EDWARD M. FLETCHER, JR.           RENE D. TEGTMEYER
Attesting Officer                Acting Commissioner of Patents